US009078242B2

(12) United States Patent
Seok

(10) Patent No.: US 9,078,242 B2
(45) Date of Patent: Jul. 7, 2015

(54) METHOD OF PERFORMING POWER SAVE MULTI-POLL (PSMP) PROCEDURE WIRELESS LOCAL ACCESS NETWORK SYSTEM AND STATION SUPPORTING THE PROCEDURE

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 13/055,926

(22) PCT Filed: Jun. 30, 2009

(86) PCT No.: PCT/KR2009/003549
§ 371 (c)(1),
(2), (4) Date: Jan. 25, 2011

(87) PCT Pub. No.: WO2010/013897
PCT Pub. Date: Feb. 4, 2010

(65) Prior Publication Data
US 2011/0128900 A1    Jun. 2, 2011

(30) Foreign Application Priority Data

Jul. 31, 2008 (KR) .......................... 10-2008-0075048

(51) Int. Cl.
*H04W 74/04* (2009.01)
*H04W 52/02* (2009.01)
(52) U.S. Cl.
CPC .......... *H04W 74/04* (2013.01); *H04W 52/0216* (2013.01); *Y02B 60/50* (2013.01)
(58) Field of Classification Search
CPC ..... H04W 52/02; H04W 72/04; H04W 84/12; H04W 80/04; H04B 7/2463
USPC .......................... 370/311, 328, 329, 338, 347
See application file for complete search history.

(56) References Cited

U.S. PATENT DOCUMENTS

| 5,465,355 | A * | 11/1995 | Cook et al. ...................... 710/38 |
| 7,333,463 | B2 * | 2/2008 | Park et al. ..................... 370/338 |
| 7,701,888 | B2 * | 4/2010 | Jang et al. ..................... 370/311 |
| 2004/0038707 | A1 | 2/2004 | Kim |
| 2005/0215274 | A1 | 9/2005 | Matson et al. |
| 2007/0086413 | A1 | 4/2007 | Jang et al. |
| 2007/0201467 | A1 * | 8/2007 | Kakani ........................ 370/390 |
| 2007/0206517 | A1 * | 9/2007 | Kakani ........................ 370/310 |
| 2007/0249355 | A1 * | 10/2007 | Kang et al. .................... 455/439 |
| 2010/0255800 | A1 * | 10/2010 | Kukani ..................... 455/166.1 |

FOREIGN PATENT DOCUMENTS

WO    WO 2008020731 A1 *  2/2008

OTHER PUBLICATIONS

Korean Intellectual Property Office Application Serial No. 10-2008-0075048, Office Action dated May 28, 2014, 4 pages.

* cited by examiner

*Primary Examiner* — Un C Cho
*Assistant Examiner* — Natali N Pascual Peguero
(74) *Attorney, Agent, or Firm* — Lee, Hong, Degerman, Kang & Waimey

(57) ABSTRACT

A method of performing a power save multi-poll (PSMP) procedure of a very high throughput (VHT) wireless local access network (WLAN) system using a bonding channel consisting of a plurality of subchannels is provided. Wherein the PSMP procedure comprises a PSMP frame transmission phase, a downlink phase, and an uplink phase, and wherein the PSMP frame comprises transmission time information indicating a time allocated to each station (STA) in each of the downlink phase and the uplink phase and transmission channel information corresponding to the transmission time information.

8 Claims, 8 Drawing Sheets

FIG. 6

| 5 bits | 1 bits | 10 bits |
|---|---|---|
| N_STA | More PSMP Indicator | PSMP Sequence Duration |

FIG. 7

| STA INFO Type(=3) | DTT start Offset | DTT Duration | STA ID | Regulatory Class | First Channel Number | Last Channel Number | Reserved |
|---|---|---|---|---|---|---|---|
| 2 bits | 11 bits | 8 bits | 16 bits | 8 bits | 8 bits | 8 bits | 3 bits |

FIG. 8

| STA INFO Type(=4) | UTT start Offset | UTT Duration | STA ID | Regulatory Class | First Channel Number | Last Channel Number | Reserved |
|---|---|---|---|---|---|---|---|
| 2 bits | 11 bits | 8 bits | 16 bits | 8 bits | 8 bits | 8 bits | 3 bits |

METHOD OF PERFORMING POWER SAVE MULTI-POLL (PSMP) PROCEDURE WIRELESS LOCAL ACCESS NETWORK SYSTEM AND STATION SUPPORTING THE PROCEDURE

CROSS-REFERENCE TO RELATED APPLICATIONS

This application is the National Stage filing under 35 U.S.C. 371 of International Application No. PCT/KR2009/003549, filed on Jun. 30, 2009, which claims the benefit of earlier filing date and right of priority to Korean Application No. 10-2008-0075048, filed on Jul. 31, 2008, the contents of which are incorporated by reference herein in their entirety.

TECHNICAL FIELD

The present invention relates to a wireless local access network (WLAN), and more particularly, to a procedure for a power save multi-poll (PSMP) in a WLAN system, a PSMP frame format for the procedure, and a station supporting the procedure.

BACKGROUND ART

With the advancement of information communication technologies, various wireless communication technologies have recently been developed. Among the wireless communication technologies, a wireless local access network (WLAN) is a technology whereby super high-speed Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared ray communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g realizes the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing speed of up to 540 Mbps at a frequency band of 5 GHz, and is based on a multiple input and multiple output (MIMO) technique which uses multiple antennas in both a transmitter and a receiver to minimize a transmission error and to optimize a data rate. In addition, this standard may use a coding scheme which transmits several duplicated copies to increase data reliability and also may use the OFDM to support a higher data rate.

Meanwhile, a basic access mechanism of an IEEE 802.11 medium access mechanism (MAC) is a carrier sense multiple access with collision avoidance (CSMA/CA) combined with binary exponential backoff. The CSMA/CA mechanism is also referred to as a distributed coordinate function (DCF) of the IEEE 802.11 MAC, and basically employs a "listen before talk" access mechanism. In this type of access mechanism, a station (STA) listens a wireless channel or medium before starting transmission. As a result of listening, if it is sensed that the medium is not in use, a listening STA starts its transmission. Otherwise, if it is sensed that the medium is in use, the STA does not start its transmission but enters a delay duration determined by the binary exponential backoff algorithm.

The CSMA/CA mechanism also includes virtual carrier sensing in addition to physical carrier sensing in which the STA directly listens the medium. The virtual carrier sensing is designed to compensate for a limitation in the physical carrier sensing such as a hidden node problem. For the virtual carrier sending, the IEEE 802.11 MAC uses a network allocation vector (NAV). The NAV is a value transmitted by an STA, currently using the medium or having a right to use the medium, to anther STA to indicate a remaining time before the medium returns to an available state. Therefore, a value set to the NAV corresponds to a duration reserved for the use of the medium by an STA transmitting a corresponding frame.

One of procedures for setting the NAV is an exchange procedure of a request to send (RTS) frame and a clear to send (CTS) frame. The RTS frame and the CTS frame include information capable of delaying transmission of frames from receiving STAs by reporting upcoming frame transmission to the receiving STAs. The information may be included in a duration filed of the RTS frame and the CTS frame. After performing the exchange of the RTS frame and the CTS frame, a source STA transmits a to-be-transmitted frame to a destination STA.

FIG. 1 is a diagram showing an IEEE 802.11 MAC architecture including a DCF. Referring to FIG. 1, a service of the DCF is used to provide a point coordination function (PCF) and a hybrid coordination function (HCF). The HCF includes an enhanced distributed channel access (EDCA) and an HCF controller channel access (HCCF). The HCF does not exist in an STA not supporting quality of service (QoS). On the other hand, both the DCF and the HCF exist in an STA supporting QoS. The PCF is an arbitrary function in all STAs. Details of the DCF, PCF, EDCA, and HCCF are disclosed in section 9 of the "MAC sublayer function description" in the IEEE 802.11-REVma/D9.0 October 2006 standard, and thus descriptions thereof will be omitted herein. The contents of the above standard are incorporated herein by reference.

Meanwhile, the IEEE 802.11n standard defines a power save multi-poll (PSMP) protocol. The PSMP protocol operates as follows. A high throughput (HT) access point (AP)

allocates a downlink transmission time (DTT) and an uplink transmission time (UTT) to each HT non-AP STA (hereinafter, 'HT STA') or HA STAs belonging to a specific group, and the HT STA communicates with the HT AP only during the DTT and UTT allocated to the HA STA.

According to the operation based on the PSMP protocol, the HT AP can sequentially transmit data frames to each of different HT STAs or HT STAs belonging to a specific group without contention overhead, and the HT STAs also can sequentially transmit data frames to the HT AP without contention overhead. Therefore, the PSMP protocol can reduce overhead caused by a CSMA/CA channel access mechanism for each HT STA. In addition, according to the PSMP protocol, each HT STA can enter a power save mode or a doze state in a time duration not allocated to that HT STA, and thus unnecessary power consumption caused by overhearing or the like can be further decreased.

With the widespread use of WLAN and the diversification of applications using the WLAN, there is a recent demand for a new WLAN system to support a higher throughput than a data processing speed supported by the IEEE 802.11n. However, an IEEE 802.11n medium access control (MAC)/physical layer (PHY) protocol is not effective to provide a throughput of 1 Gbps or more. This is because the IEEE 802.11n MAC/PHY protocol is designed for an operation of a single STA, that is, an STA having one network interface card (NIC), and thus when a frame throughput is increased while maintaining the conventional IEEE 802.11n MAC/PHY protocol, a resultant additional overhead is also increased. Consequently, there is a limitation in increasing a throughput of a wireless communication network while maintaining the conventional IEEE 802.11n MAC/PHY protocol, that is, a single STA architecture.

Therefore, to achieve a data processing speed of 1 Gbps or more in the wireless communication system, a new system different from the conventional IEEE 802.11n MAC/PHY protocol (i.e., single STA architecture) is required. A very high throughput (VHT) system is a next version of the IEEE 802.11n WLAN system, and is one of IEEE 802.11 WLAN systems which have recently been proposed to support a data processing speed of 1 Gbps or more in a MAC service access point (SAP). The VHT system is named arbitrarily. To provide a throughput of 1 Gbps or more, a feasibility test is currently being conducted for the VHT system using 4×4 MIMO and a channel bandwidth of 80 MHz. In particular, a VHT WLAN system having a channel bandwidth of 20 MHz and consisting of 4 contiguous subchannels (hereinafter, referred to as a bonding channel) is actively discussed in recent years. However, embodiments of the present invention are not limited to the VHT WLAN system using the bonding channel.

In a VHT WLAN system consisting of 3 or more contiguous subchannels, it is not much effective to directly use the PSMP protocol defined in the IEEE 802.11n in terms of usage efficiency of radio resources. More specifically, assume that a VHT WLAN system including both a HT STA (i.e., legacy STA) and a VHT STA directly uses the PSMP protocol defined in the IEEE 802.11n. In this case, at a specific time, a full channel bandwidth is occupied by only an STA to which a DTT or a UTT is allocated. If the STA allocated to the DTT or the UTT is not the VHT STA but the HT STA, the HT STA cannot entirely use the full channel bandwidth that can be used in the VHT WLAN system. This is because the HT STA supports a channel bandwidth of 20 MHz or 40 MHz. As a result, in a case where the DTT or the UTT is allocated only to the HT STA, not to the VHT STA, in the VHT WLAN system directly using the PSMP protocol of the IEEE 802.11n, some subchannels (i.e., a subchannel of 40 MHz or a subchannel of 60 MHz) among the full channel bandwidth cannot be used.

In addition, the direct use of the PSMP protocol of the IEEE 802.11n results in a problem in that the full channel bandwidth cannot be effectively used even if the DTT or the UTT is allocated to the VHT STA. More specifically, the full channel bandwidth of the VHT STA is significantly broad, for example, 80 MHz. However, if the PSMP protocol of the IEEE 802.11n is directly used, the broad bandwidth is always used by only one VHT STA. Of course, this is not a big problem when a channel needs to be entirely used since a large amount of data is transmitted or received by the VHT STA. However, there may be a case where a small amount of data is transmitted or received by the VHT STA. In this case, if the entire channel is used only by the VHT STA, effective, adaptive, or active use of radio resources cannot be achieved.

DISCLOSURE OF INVENTION

Technical Problem

The present invention provides a power save multi-poll (PSMP) procedure capable of effectively and adaptively using all radio resources in a very high throughput (VHT) wireless local access network (WLAN) system.

The present invention also provides a PSMP procedure of a VHT WLAN system, whereby a plurality of VHT stations (STAs) can simultaneously communicate with a VHT access point (AP), or the VHT STA and a legacy STA can simultaneously communicate with the VHT AP at a downlink transmission time (DTT) or an uplink transmission time (UTT).

The present invention also provides a PSMP procedure of a VHT WLAN system in which a VHT STA coexists with a legacy STA (i.e., high throughput (HT) STA), whereby usage efficiency of all radio resources can be increased and the VHT STA and the HT STA can operate according to a PSMP protocol.

Technical Solution

According to an aspect of the present invention, there is provided a method of performing a power save multi-poll (PSMP) procedure of a very high throughput (VHT) wireless local access network (WLAN) system using a bonding channel consisting of a plurality of subchannels, wherein the PSMP procedure comprises a PSMP frame transmission phase, a downlink phase, and an uplink phase, and wherein the PSMP frame comprises transmission time information indicating a time allocated to each station (STA) in each of the downlink phase and the uplink phase and transmission channel information corresponding to the transmission time information.

According to another aspect of the present invention, there is provided a method of performing a power save multi-poll (PSMP) procedure of a very high throughput (VHT) wireless local access network (WLAN) system using a bonding channel consisting of a plurality of subchannels, wherein a VHT access point (AP) transmits a PSMP frame in which a receiving address (RS) is set to a specific group address, and wherein the PSMP frame comprises downlink transmission time information or uplink transmission time information indicating a time allocated to each station (STA) together with information on a set of subchannels allocated to the downlink transmission time or the uplink transmission time.

According to still another aspect of the present invention, there is provided a method of performing a power save multi-poll (PSMP) procedure of a very high throughput (VHT) wireless local access network (WLAN) system using a bonding channel consisting of a plurality of subchannels, wherein a VHT access point (AP) transmits a multi-channel PSMP frame, and wherein, at a specific PSMP downlink transmission time or a specific PSMP uplink transmission time allocated by the multi-channel PSMP frame, a plurality of stations (STAs) simultaneously perform downlink transmission or uplink transmission by using each subchannel allocated by the multi-channel PSMP frame.

According to still another aspect of the present invention, there is provided a method of configuring a power save multi-poll (PSMP) frame for a PSMP sequence in a very high throughput (VHT) wireless local access network (WLAN) system using a bonding channel consisting of a plurality of subchannels, wherein the PSMP frame comprises zero or more Downlink PSMP station (STA) Info fields and zero or more Uplink PSMP STA Info fields, and wherein the Downlink PSMP STA Info field comprises PSMP channel set information indicating a set of channels allocated to a corresponding downlink transmission time, and the Uplink PSMP STA Info field comprises PSMP channel set information indicating a set of channels allocated to a corresponding uplink transmission time.

Advantageous Effects

One or more subchannels are allocated for each of a plurality of stations (STAs) according to a power save multi-poll (PSMP) procedure of a very high throughput (VHT) wireless local access network (WLAN) system. Therefore, the plurality of STAs can simultaneously perform downlink transmission or uplink transmission. Since a plurality of subchannels can be used by adaptively being segmented according to the PSMP procedure in an exemplary embodiment of the present invention, usage efficiency of radio resources can be improved.

BRIEF DESCRIPTION OF DRAWINGS

FIG. 6 is a diagram showing an exemplary format of a PSMP Header field.

FIG. 7 is a diagram showing an exemplary format of a Downlink PSMP station (STA) Info field which can be included in a PSMP STA Info field of FIG. 5.

FIG. 8 is a diagram showing an exemplary format of an Uplink PSMP STA Info field which can be included in a PSMP STA Info field of FIG. 5.

MODE FOR THE INVENTION

Figure 1:
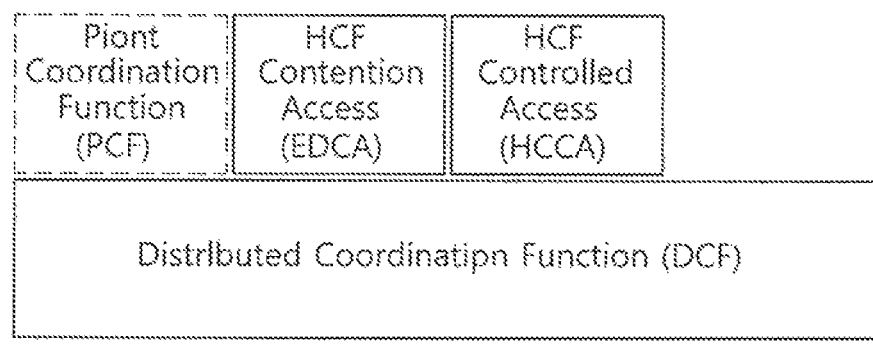
FIG. 1 is a diagram showing an institute of electrical and electronics engineers (IEEE) 802.11 medium access mechanism (MAC) architecture including a distributed coordinate function (DCF).
Figure 2:
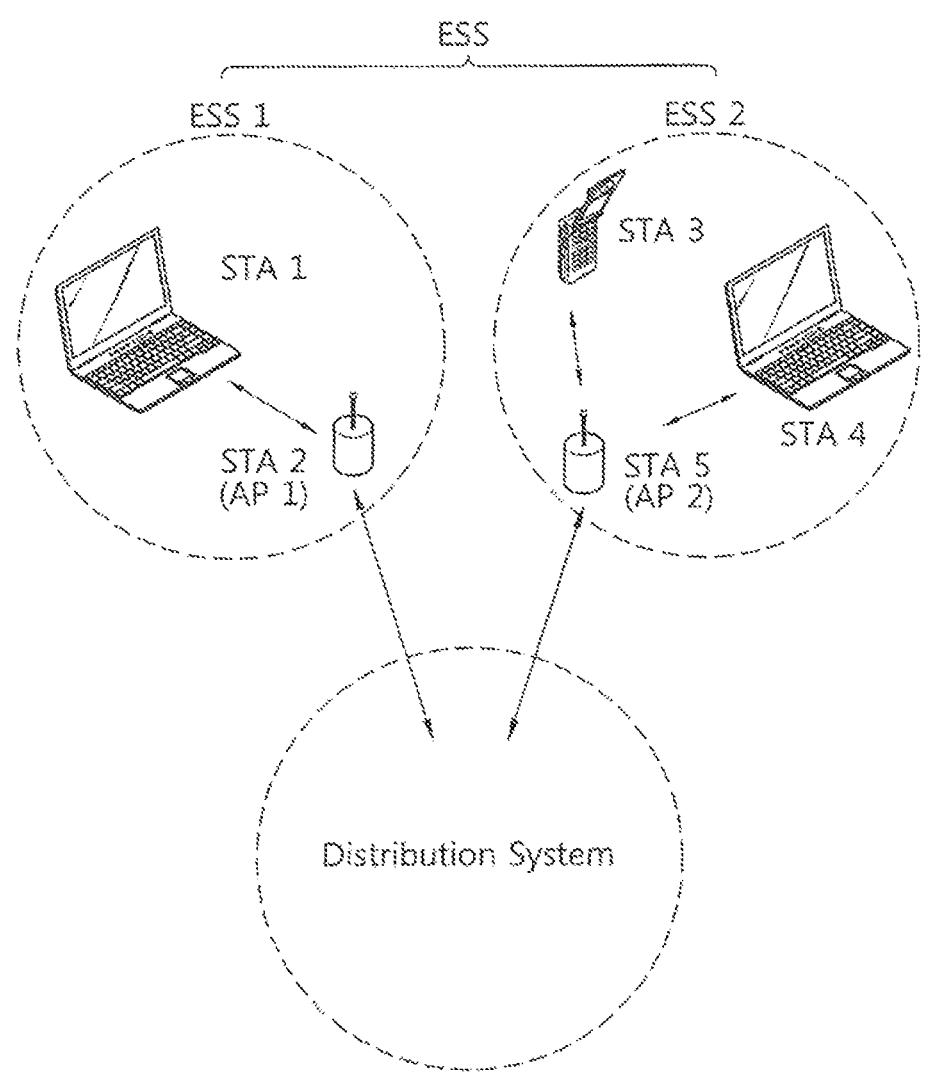
FIG. 2 is a schematic view showing an exemplary structure of a wireless local access network (WLAN) system according to an embodiment of the present invention.

FIG. 2 is a schematic view showing an exemplary structure of a wireless local access network (WLAN) system according to an embodiment of the present invention.

Referring to FIG. 2, the WLAN system includes one or more basis service sets (BSSs). The BSS is a set of stations (STAs) which are successfully synchronized to communicate with one another, and is not a concept indicating a specific region. A very high throughput (VHT) BSS is defined as a BSS that supports a super-high data processing speed of 1 GHz or more in a medium access control (MAC) service access point (SAP) as in the WLAN system compliant with the embodiment of the present invention.

A VHT system including one or more VHT BSSs can use a channel bandwidth of 80 MHz, which is for exemplary purposes only. For example, the VHT system may use a channel bandwidth of 60 MHz or 100 MHz or more. As such, the VHT system operates in a multi-channel environment in which a plurality of subchannels having a specific size, e.g., a channel bandwidth of 20 MHz, are included.

The BSS can be classified into an infrastructure BSS and an independent BSS (IBSS). The infrastructure BSS is shown in FIG. 2. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. A VHT STA is defined as an STA that supports the super-high data processing speed of 1 GHz or more in the multi-channel environment to be described below. In the VHT WLAN system compliant with the embodiment of the present invention, all STAs included in the BSS may be VHT STAs, or the VHT STA may coexist with a legacy STA (e.g., a high throughput (HT) STA based on the IEEE 802.11n).

The STA for wireless communication includes a processor and a transceiver, and also includes a user interface, a display unit, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, STA6, STA7, and STA8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT STA is defined as a non-AP STA that supports the super-high data processing speed of 1 GHz or more in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super-high data processing speed of 1 GHz or more in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service defined in the IEEE 802.11 can be provided. For example, the DS may be a wireless network such as a mesh network, or may be a physical structure for interconnecting APs.

Figure 3:
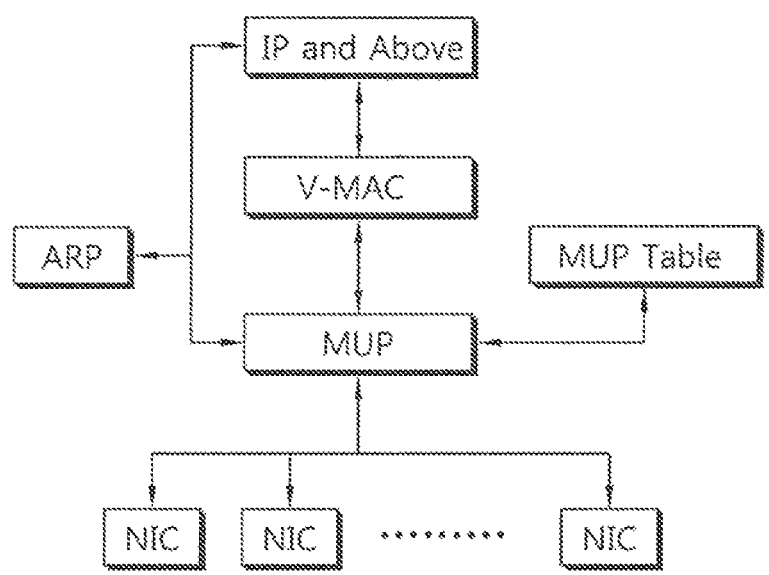
FIG. 3 is a block diagram showing a multi-radio unification protocol (MUP) as an example of a protocol applicable to a very high throughput (VHT) system including a plurality of network interface cards (NICs) each having an independent radio interface.

FIG. 3 is a block diagram showing a multi-radio unification protocol (MUP) as an example of a protocol applicable to a VHT system including a plurality of network interface cards (NICs) each having an independent radio interface. An embodiment of the present invention described below can apply not only when a plurality of subchannels are managed by using several NICs as shown in FIG. 3 but also when several subchannels are managed by using orthogonal frequency division multiplexing (OFDM) while using a single NIC, as apparent to those skilled in the art. That is, FIG. 3 is shown for exemplary purposes only, and thus the embodiment of the present invention is not limited thereto.

Referring to FIG. 3, an STA supporting the MUP includes a plurality of NICs. The NICs are separately depicted in FIG. 3, which implies that each NIC independently operates a MAC/PHY module. That is, the NICs are distinctively depicted in FIG. 3 to show that the NICs are logical entities operating according to individual MAC/PHY protocols. Therefore, the plurality of NICs can be implemented with physically distinctive functional entities, or can be implemented by integrating the physical entities into one physical entity.

According to one aspect of the present embodiment, the plurality of NICs can be classified into a primary radio interface and one or more secondary radio interfaces. If a plurality of secondary radio interfaces are present, the secondary radio interfaces can be classified into a first secondary radio interface, a second secondary radio interface, a third secondary radio interface, etc. The classification into the primary interface and the secondary interface and/or the classification of the secondary ratio interface itself may be determined by a policy or may be adoptively determined in consideration of a channel environment.

The plurality of NICs are integrally managed according to the MUP. As a result, the plurality of NICs are externally recognized as if they are one device. For this, the VHT system includes a virtual-MAC (V-MAC). Through the V-MAC, an upper layer cannot recognize that a multi-radio channel is operated by the plurality of NICs. As such, in the VHT system, the upper layer does not recognize the multi-radio channel through the V-MAC. This means that one virtual Ethernet address is provided.

Next, a power save multi-poll (PSMP) procedure of a VHT system will be described according to embodiments of the present invention. Although the embodiments described below relate to a VHT system using a bonding channel in which contiguous 4 subchannels having a bandwidth of 20 MHz are combined (i.e., a bonding channel having a channel bandwidth of 80 MHz), this is for exemplary purposes only. The embodiments described below can equally apply to a VHT system including a plurality of subchannels (e.g., 3 or 5 or more subchannels) or to a VHT system using an aggregated channel different from the bonding channel, as apparent to those skilled in the art. In addition, the embodiments of the present invention are not limited to the VHT system whose subchannel has a bandwidth of 20 MHz.

Figure 4:
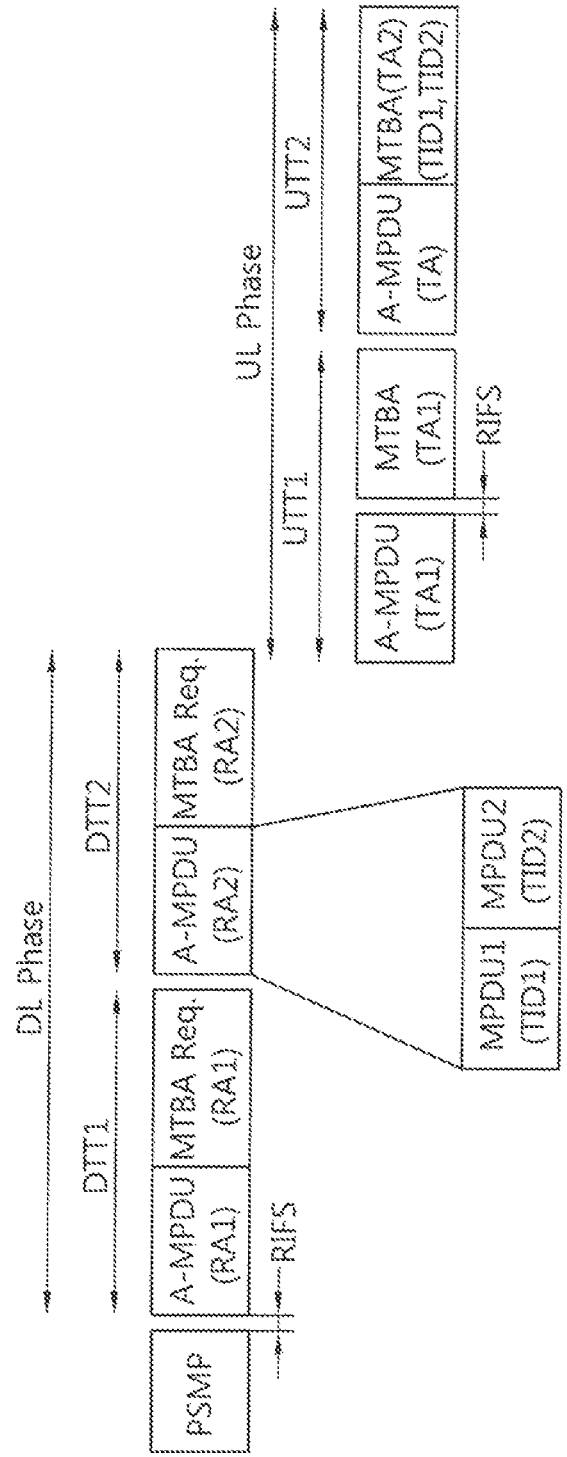
FIG. 4 is a diagram showing an example of a power save multi-poll (PSMP) operation performed using a PSMP procedure in a VHT WLAN system according to an embodiment of the present invention.

FIG. 4 is a diagram showing an example of a PSMP operation performed using a PSMP procedure of a VHT WLAN system according to an embodiment of the present invention. The PSMP operation includes a PSMP frame transmission phase, a downlink (DL) phase, and an uplink (UL) phase. The PSMP operation can be expressed with a PSMP sequence. The PSMP sequence denotes a sequence of frames of which a first frame is a PSMP frame, followed by frames transmitted during zero or more PSMP-downlink transmission times (DTTs) and then followed by frames transmitted during zero or more PSMP-uplink transmission times (UTTs).

Referring to FIG. 4, in a first phase of the PSMP operation, i.e., in the PSMP frame transmission phase, a VHT AP multicasts/broadcasts a PSMP frame. That is, the PSMP frame is a first frame of the PSMP sequence, and a destination address (DA) or a receiving address (RA) of the PSMP frame is a specific group address. The PSMP frame is an action frame transmitted by the VHT AP to STAs belonging to a specific group. The PSMP frame may include information on a DTT of the DL phase and information on a UTT of the UL phase, that is, may include information indicating to which STAs the DTT is allocated and to which STAs the UTT is allocated. For example, regarding the PSMP sequence shown in FIG. 4, the information included in the PSMP frame indicates that a DTT1 and a DTT2 of the DL phase are respectively allocated to an STA1 and an STA2 and indicates that a UTT1 and a UTT2 of the UL phase are respectively allocated to the STA1 and the STA2. Herein, an RA1 and a TA1 of FIG. 4 relate to the STA1, and an RS2 and a TA2 of FIG. 4 relate to the STA2. In addition, according to the embodiment of the present invention, when a specific DTT and/or UTT is allocated to a specific STA, the PSMP frame also includes information indicating radio resources (i.e., subchannels) to be allocated to the specific DTT and/or UTT.

The end of the PSMP frame transmission phase is followed by a specific frame spacing (e.g., reduced inter-frame spacing (RIFS)) and then followed by the DL phase. In the DL phase (i.e., DTT), the STA1 transitions to an awake state at the DTT1 and thus receives a MAC protocol data unit (A-MPDU) transmitted from the VHT AP and a multi-TID block ACK request frame (MTBA Req.). Then, the STA1 can enter a dose state. Subsequently, the STA2 transitions to the awake state at the DTT2 and thus receives an A-MPDU (i.e., MPDU1 (TID1) and MPDU2(TID2)) transmitted from the VHT AP and a multi-TID block ACK request frame (MTBA Req.). Then, the STA2 can enter the dose state.

The end of the DL phase is followed by the UL phase. In the UL phase (i.e., UTT), the STA1 transitions to the awake state at the UTT1 and thus transmits an A-MPDU and a multi-TID block ACK frame (MTBA) to the VHT AT. A specific RIFS exists between the A-MPDU and the MTBA. Then, the STA1 can enter the doze state. Consequently, the STA2 transitions to the awake state at the UTT2 and thus transmits the A-MPDU and the MTBA to the VHT AP. In this case, the MTBA can be transmitted in combination with a related A-MPDU instead of being transmitted at separate timing. Then, the STA2 can enter the dose state.

When applying the PSMP sequence mentioned in the description of the PSMP operation above to the HT WLAN based on the IEEE 802.11n standard, usage efficiency of radio resources is not much decreased even if the entire channel is allocated to one HT STA at a specific time or even if only one subchannel is allocated to the HT STA or the legacy STA. Therefore, in the PSMP procedure of the HT WLAN system, it is sufficient for the PSMP frame to include only information on an STA allocated to a DTT and a UTT. However, in the PSMP procedure of the VHT WLAN system, one STA can use the full channel bandwidth of the VHT WLAN system by allowing the PSMP frame to include only the information on the STA allocated to the DTT and the UTT. Therefore, usage efficiency of radio resources is inevitable decreased. Therefore, preferably, the PSMP frame for the PSMP procedure of the VHT WLAN system includes additional information capable of effectively allocating subchannels. Accordingly, the embodiment of the present invention proposes a PSMP frame with a new format that can be used in the PSMP procedure of the VHT WLAN system.

A PSMP STA Info field of the PSMP frame can be used in the PSMP procedure of the VHT WLAN system including three or more subchannels (e.g., such a procedure can also be referred to as a 'multi-channel PSMP procedure'). In addition to information on a specific DTT allocated to each STA and information on a specific UTT allocated to each STA, the PSMP STA Info field further includes information on subchannels allocated to a corresponding time, e.g., PSMP channel set information. The PSMP channel set information is information specifying one or more subchannels allocated to a corresponding STA at a DTT and a UTT allocated to each STA. The PSMP channel set information may be a set of contiguous subchannels, but the embodiment of the present invention is not limited thereto. For example, the PSMP channel set information may be information indicating non-contiguous subchannels.

Figure 5:
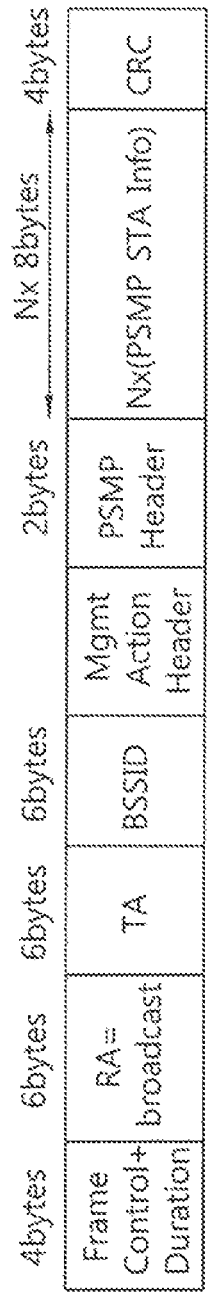
FIG. 5 is a diagram showing some constitutional elements included in a PSMP frame that can be used in a PSMP procedure of a VHT WLAN system according to an embodiment of the present invention.

FIG. 5 is a diagram showing some constitutional elements included in a PSMP frame that can be used in a PSMP procedure of a VHT WLAN system according to an embodiment of the present invention. Referring to FIG. 5, the PSMP frame includes a Frame Control+Duration field, a receiving address (RA) field, a transmitter address (TA) field, a basic service set identifier (BSSID) field, a Mgmt Action Header field, a PSMP Header field, N 'PSMP STA Info' fields, and a Cyclic Redundancy Check (CRC) field.

The Frame Control+Duration field includes a variety of information required to control a management action frame (e.g., a VHT-related management action frame) used in the WLAN and also includes duration information for setting a network allocation vector (NAV) for a neighbor STA. The information required for frame control includes a protocol version, a type and its subtype, To DS, From DS, power management, etc., which is for exemplary purposes only. Herein, a type of the PSMP frame may be a management frame, and its subtype may be an action frame.

The RA field specifies a receiving STA that receives the PSMP frame. In case of the PSMP frame, an RA or a destination address (DA) can be specified as a specific group address or a broadcast address. The TA field can be set to an address of the VHT AT that transmits the PSMP frame. The BSSID field is set to a value indicating an identifier of a BSS managed by the VHT AP that transmits the PSMP frame.

In addition to the aforementioned information included in a header part of the PSMP frame or the Mgmt Action Header field, the Mgmt Action Header field may also include another information which is also referred to as a PSMP Parameter Set field. The Mgmt Action Header field defines the number of PSMP STA Info fields included in the PSMP frame and indicates whether the PSMP frame is followed by another PSMP frame. Further, the Mgmt Action Header field is used to indicate a duration of the PSMP frame.

An exemplary format of the PSMP header is shown in FIG. 6. Referring to FIG. 6, the PSMP Header field includes an N_STA subfield for indicating the number of PSMP STA Info fields existing in the PSMP frame including a corresponding PSMP Header field, a More PSMP Indicator subfield for indicating whether the PSMP frame is followed by another PSMP frame, and a PSMP Sequence Duration subfield for indicating a duration of the PSMP frame.

FIG. 7 and FIG. 8 are diagrams showing exemplary formats of a Downlink PSMP STA Info field and an Uplink PSMP STA Info field, each of which can be included in the PSMP STA Info field of FIG. 5. The PSMP STA Info field of FIG. 5 relates to individually addressed cases, and may include zero or more Downlink PSMP STA Info fields and zero or more Uplink PSMP STA Info fields. The PSMP STA Info field of group addressed cases further includes PSMP channel group information (to be described below in detail) in addition to an STA_INFO Type subfield, a PSMP-DTT Start Offset subfield, a PSMP-DTT Duration subfield, and a PSMP Group Address ID subfield. Hereinafter, the Downlink/Uplink PSMP STA Info field for the individually addressed cases will be described in detail.

Referring to FIG. 7 and FIG. 8, the Downlink/Uplink PSMP STA Info field includes an STA_INFO Type subfield, a DTT/UTT Start Offset subfield, a DTT/UTT Duration subfield, an STA ID subfield, and PSMP channel set information. The PSMP channel set information includes a regulatory class of a subchannel allocated to a corresponding STA (i.e., STA ID) at a corresponding DTT/UTT and includes the allocated subchannel. If contiguous subchannels are allocated, a First Channel Number subfield may include a start subchannel number of allocated radio resources, and a Second Channel Number subfield may include a last subchannel number of the allocated radio resources. The PSMP channel set information and a size of each subfield are shown in FIG. 7 and FIG. 8 for exemplary purposes only, and it will be apparent to those skilled in the art that various modifications can be made.

The STA_INFO Type subfield is used to indicate whether the PSMP STA Info field relates to the individually addressed case or the group addressed case, or as in the embodiment of the present invention, to indicate whether the PSMP channel set information is included. For example, if the STA_INFO Type subfield is set to '1', the PSMP STA Info field can have a format of the group addressed case. In addition, if the STA_INFO Type subfield is set to '2', the PSMP STA Info field can have a format of the individually addressed case. In addition, if the STA_INFO Type subfields are set to '3' and '4', the PSMP STA Info field can have a format including the subchannel set information as shown in FIG. 7 or FIG. 8.

The DTT/UTT Start Offset subfield indicates a start of a PSMP-DTT/UTT relative to an end of the PSMP frame with respect to a destination STA identified by the PSMP STA Info field. The subfield indicates a start time of a first PHY protocol data unit (PPDU) including DL/UL data for the destination STA. The DTT/UTT Duration subfield indicates a duration of the PSMP-DTT/UTT for the destination STA indicated by the PSMP STA Info field. The subfield indicates an end time of a last PPDU including the DL/UL data for the destination STA, and is a value relative to a value that is set in the PSMP-DTT/UTT Time Offset subfield. The STA ID subfield includes an associated identifier (AID) of a STA indicated by the PSMP STA Info field.

When the conventional PSMP frame based on the IEEE 802.11n standard is used in the VHT WLAN system, one STA is used by being allocated to any DTT or UTT. That is, only one STA occupies the full channel bandwidth at one time. An HT STA supporting the PSMP supports only a channel bandwidth of 20 MHz or 40 MHz, and thus if the HT STA accesses the VHT AP to use the PSMP, the channel bandwidth of 60 MHz or 40 MHz is discarded during a time when the HT STA uses a channel. According to the embodiment of the present invention, to avoid waste of radio resources, the PSMP STA Info field includes information on a subchannel allocated to a corresponding time in addition to information on a DTT/UTT. The information on the subchannel can be included in the PSMP channel set information.

Referring to FIG. 7 and FIG. 8, the information on the subchannel according to the embodiment of the present invention may include a Regulator Class subfield, a First Channel Number subfield, and a Last Channel Number subfield. Such a format is effective when information on a channel allocated to each STA is for contiguous subchannels. However, the embodiment of the present invention is not limited to that format, and it will be apparent to those skilled in the art that various modifications can be made. For example, instead of a first subchannel number and a last subchannel number, a format can be configured so that a channel number allocated to each STA can be individually specified.

The Regulator Class subfield can indicate information on a frequency domain to which a corresponding subchannel belongs. The First Channel Number subfield can be set to a minimum value among numbers assigned to subchannels belonging to a PSMP channel set. The Last Channel Number subfield can be set to a maximum value among the numbers assigned to subchannels belonging to the PSMP channel set.

According to the embodiment of the present invention, several STAs can simultaneously perform uplink transmission or downlink transmission at any time. For example, uplink or downlink transmission can be performed by varying a destination STA for each subchannel. However, the DL phase and the UL phase cannot overlap with each other within the same PSMP sequence. That is, during a time when a DTT is allocated to a certain STA, a UTT cannot be used by another STA.

The invention claimed is:

1. A method for a wireless local access network (WLAN) system using a plurality of subchannels, the method comprising:
   receiving, by a mobile station from an access point, a frame to indicate a plurality of subchannels on which the mobile station is permitted to receive or transmit with a basic service set (BSS),
   wherein, if station type information is set to a first value, the frame includes subchannel information and subchannel start information, the subchannel information indicating one or more subchannels from the plurality of subchannels on which there is expected or permitted to be an uplink transmission or a downlink transmission at a time given by the subchannel start information, the subchannel start information indicating a start time for when the access point expects transmission activities on the one or more subchannels indicated by the subchannel information;
   and
   accessing, by the mobile station, the one or more subchannels indicated by the subchannel information at the start time indicated by the subchannel start information,
   wherein the subchannel information includes first subchannel number bit information and second subchannel number bit information, the first subchannel number bit information indicating whether the uplink transmission or the downlink transmission is permitted to be on a first subchannel having a lowest subchannel number of the plurality of subchannels, the second subchannel number bit information indicating whether the uplink transmission or the downlink transmission is permitted to be on a second subchannel having a next subchannel number with respect to the first subchannel,
   wherein each of the plurality of subchannels is defined as a bandwidth operating in a frequency band of the BSS, and
   wherein, if the station type information is set to a second value, the frame does not include the subchannel information and the subchannel start information.

2. The method of claim 1, wherein the frame is broadcast by the access point.

3. The method of claim 1, wherein a number of bits for the subchannel information is less than a number of bits for the subchannel start information.

4. The method of claim 1, wherein a number of bits for the subchannel start information is larger than 10.

5. A device for a wireless local access network (WLAN) system using a plurality of subchannels, the device comprising:
   a transceiver; and
   a processor operatively coupled with the transceiver and configured to:
   receive, from an access point, a frame to indicate a plurality of subchannels on which the device is permitted to receive or transmit with a basic service set (BSS);
   wherein, if station type information is set to a first value, the frame
   includes subchannel information and subchannel start information, the subchannel information indicating one or more subchannels from the plurality of subchannels on which there is expected or permitted to be an uplink transmission or a downlink transmission at a time given by the subchannel start information, the subchannel start information indicating a start time for when the access point expects transmission activities on the one or more subchannels indicated by the subchannel information; and
   access the one or more subchannels indicated by the subchannel information at the start time indicated by the subchannel start information,
   wherein the subchannel information includes first subchannel number bit information and second subchannel number bit information, the first subchannel number bit information indicating whether the uplink transmission or the downlink transmission is permitted to be on a first subchannel having a lowest subchannel number of the plurality of subchannels, the second subchannel number bit information indicating whether the uplink transmission or the downlink transmission is permitted to be on a subchannel channel having a next subchannel number with respect to the first subchannel, wherein each of the plurality of subchannels is defined as a bandwidth operating in a frequency band of the BSS, and wherein, if the station type information is set to a second value, the frame does not include the subchannel information and the subchannel start information.

6. The device of claim 5, wherein the frame is broadcast by the access point.

7. The device of claim 5, wherein a number of bits for the subchannel information is less than a number of bits for the subchannel start information.

8. The device of claim 5, wherein a number of bits for the subchannel start information is larger than 10.

* * * * *